(12) United States Patent
Rimmelspacher et al.

(10) Patent No.: US 9,849,741 B2
(45) Date of Patent: Dec. 26, 2017

(54) TRAILER COUPLING

(71) Applicant: Scambia Holdings Cyprus Limited, Limassol (CY)

(72) Inventors: Bernhard Rimmelspacher, Rheinstetten (DE); Wolfgang Gentner, Steinheim (DE); Aleksej Kadnikov, Leonberg (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/994,891

(22) Filed: Jan. 13, 2016

(65) Prior Publication Data

US 2016/0200158 A1 Jul. 14, 2016

(30) Foreign Application Priority Data

Jan. 14, 2015 (DE) .................. 10 2015 100 490

(51) Int. Cl.
*B60D 1/54* (2006.01)
*B60D 1/56* (2006.01)
*B60D 1/06* (2006.01)
*B60D 1/48* (2006.01)

(52) U.S. Cl.
CPC ................. *B60D 1/56* (2013.01); *B60D 1/06* (2013.01); *B60D 1/485* (2013.01)

(58) Field of Classification Search
CPC ..... B60D 1/54; B60D 2001/544; B60D 1/485
See application file for complete search history.

(56) References Cited

U.S. PATENT DOCUMENTS

| 7,216,886 | B2 * | 5/2007 | Rimmelspacher | B60D 1/54 |
| | | | | 280/478.1 |
| 7,604,249 | B2 * | 10/2009 | Gentner | B60D 1/26 |
| | | | | 280/478.1 |
| 7,699,335 | B2 * | 4/2010 | Riehle | B60D 1/54 |
| | | | | 280/478.1 |
| 8,424,898 | B2 * | 4/2013 | Rimmelspacher | B60D 1/06 |
| | | | | 280/491.1 |
| 2007/0138224 | A1 * | 6/2007 | Rimmelspacher | B60D 1/54 |
| | | | | 224/519 |

(Continued)

FOREIGN PATENT DOCUMENTS

DE 10 2008 012 622 A1 9/2009
DE 10 2013 100 777 A1 7/2014

(Continued)

*Primary Examiner* — Kevin Hurley
*Assistant Examiner* — Michael R Stabley
(74) *Attorney, Agent, or Firm* — Reinhart Boerner Van Deuren P.C.

(57) ABSTRACT

In the case of a trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, it is proposed according to the invention that the holding base should have a flange unit, for receiving the bearing unit, and two holding elements that project from the flange unit and in so doing run at a spacing from one another and act on the cross member.

22 Claims, 11 Drawing Sheets

(56) References Cited

U.S. PATENT DOCUMENTS

| | | | | |
|---|---|---|---|---|
| 2011/0031718 A1* | 2/2011 | Di Parma | ............... | B60D 1/06 |
| | | | | 280/504 |
| 2012/0056448 A1* | 3/2012 | Takahashi | ............... | B60D 1/06 |
| | | | | 296/203.04 |
| 2013/0093162 A1* | 4/2013 | Gentner | ................ | B60D 1/06 |
| | | | | 280/498 |
| 2014/0210185 A1 | 7/2014 | Pietschmann | | |

FOREIGN PATENT DOCUMENTS

| | | |
|---|---|---|
| EP | 2 261 066 B1 | 9/2014 |
| WO | WO 2006/068479 A1 | 6/2006 |

\* cited by examiner

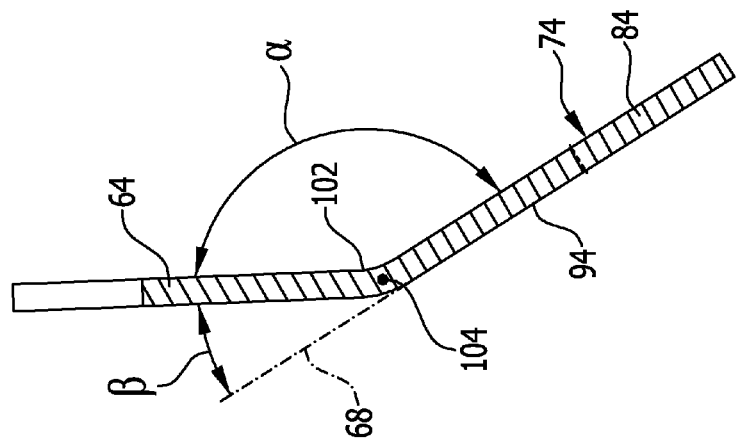
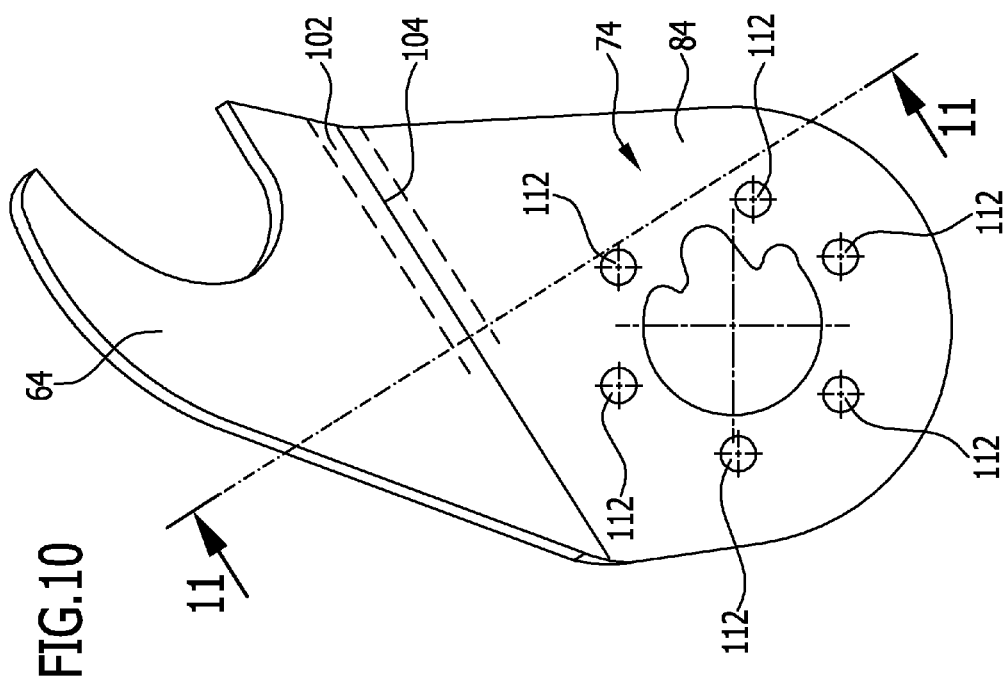

TRAILER COUPLING

CROSS-REFERENCE TO RELATED PATENT APPLICATIONS

This patent application claims the benefit of German application No. 10 2015 100 490.9, filed Jan. 14, 2015, the teachings and disclosure of which are hereby incorporated in their entirety by reference thereto.

BACKGROUND OF THE INVENTION

The invention relates to a trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member.

Trailer couplings of this kind are known from the prior art, for example EP 2 261 066.

These trailer couplings have the problem that the holding base is to be produced with as much stability and at as low a cost as possible.

SUMMARY OF THE INVENTION

This problem is solved according to the invention in the case of a trailer coupling of the type mentioned in the introduction in that the holding base has a flange unit, for receiving the bearing unit, and two holding elements that project from the flange unit and in so doing run at a spacing from one another and act on the cross member.

The advantage of the solution according to the invention is that the holding elements that run, projecting from the flange unit, at a spacing from one another and act on the cross member make possible a connection between the bearing unit and the cross member that is stable and in particular resistant to bending and low in cost.

In principle, it would be conceivable for the holding base to be composed from the flange unit and the holding elements.

A solution that, from the point of view of production, is particularly advantageous provides for the holding base to be formed by two elements made from flat material, each of which includes a flange element that contributes to the formation of the flange unit, and each of which forms one of the holding elements that extend, projecting from the flange unit, in the direction of the cross member.

The flange elements could for example be arranged separated by spacer elements for formation of the flange unit.

It is particularly favourable if the flange unit comprising the flange elements is formed such that the flange elements abut against one another by means of mutually facing abutment sides.

A solution of this kind has the advantage that, because of the structure of the flange unit comprising two flange elements, it has the effect that a stable flange unit is producible in a simple manner.

Further, it is preferably provided for each of the holding elements to be firmly connected to the respective flange element and in this way for the stable connection to be made between the cross member and the respective flange element.

In this arrangement, the holding elements could be connected to the respective flange element by positive locking or by joining.

A particularly advantageous solution provides for each of the holding elements to merge in one piece with the respective flange element such that as a result each holding element having the associated flange element is producible in a particularly simple and thus low-cost manner.

Advantageously, each of the holding elements is arranged in relation to the corresponding flange element such that it merges with the respective flange element by way of a bend region.

No statements have yet been made as regards the alignment of the holding elements in relation to one another.

Thus, a particularly favourable solution provides for the holding elements to run at an increasing spacing from one another as the spacing from the flange unit increases.

A preferred solution provides for the respective holding elements to extend at an increasing spacing from a centre plane of the flange unit as the extent away from the flange unit increases.

Preferably, the centre plane of the flange unit is defined as the geometric plane that runs between the flange elements—which for example abut against one another—in the flange unit.

A structurally particularly simple solution provides for the holding elements to be bent around along a bend line in relation to the corresponding flange elements such that a path of the holding elements in relation to the centre plane is produced in which the holding elements, projecting from the bend line, also extend at an increasing spacing from the centre plane as the extent away from the bend line increases.

In the simplest case, both the flange element and the holding element are formed from a planar piece of flat material and consequently lie at an angle to one another.

In this arrangement, in a particularly simple case, the holding elements lie at an acute angle to a centre plane of the flange unit.

In particular, the holding element and the respective flange element of the respective element form an obtuse angle with one another.

In this arrangement, it is provided for example for the obtuse angle between the holding element and the respective flange element to be in the range between 100 degrees and 170 degrees and preferably in the range between 120 degrees and 160 degrees.

In order to achieve the optimum possible stability, it is preferably provided for a projection of the bend lines of the elements onto the centre plane to result in an intersecting path of the projected bend lines—that is to say for the bend lines projected onto the centre plane to run transversely to one another.

In particular, in this arrangement it is provided for the projected bend lines to form an acute angle with one another that is for example in the range between 15 degrees and 140 degrees, preferably in the range between 40 degrees and 100 degrees.

Because the projected bend lines run transversely to one another in the centre plane, the holding base produced from the two elements having the flange elements and the holding elements is particularly resistant to bending and twisting, since in each case one of the elements counters a flexural elastic behaviour of the other of the elements.

More detailed statements have not yet been made as regards the connection between the holding elements and the cross member.

In principle, it would be conceivable to join the holding elements for example to the cross member by screwing or adhesion.

However, a particularly favourable solution provides for the holding elements to be welded to the cross member.

A stable connection between the holding elements and the cross member is in particular achievable if the holding elements abut against an outer peripheral surface of the cross member.

In this arrangement, in particular the holding elements are provided with cross member receptacles that abut against the outer peripheral surface of the cross member.

The cross member receptacles preferably take the form of cutouts provided in the holding elements such that in the region of the cross member receptacles the holding elements extend transversely to the cross member, in particular at an angle other than 90°.

In particular, the cross member receptacles are formed by edge contours, delimiting the cutouts, of the holding elements that abut against the outer peripheral surface of the cross member.

In this arrangement, in theory the cross member receptacles could abut against the outer peripheral surface of the cross member in individual regions.

However, a particularly advantageous solution provides for the cross member receptacles to abut against the outer peripheral surface along their edge contours.

In order, in this arrangement, to provide a stable connection to the cross member, it is preferably provided for the cross member receptacles to engage around the outer peripheral surface of the cross member over an angular range of at least 120° in relation to a centre axis of the cross member.

Preferably, it is provided for the cross member receptacles to engage around the outer peripheral surface of the cross member over an angle of at least 150 degrees, and preferably at least 180 degrees.

Further, preferably the cross member receptacles are welded to the cross member linearly and along their edge contour.

A particularly stable embodiment of the holding base provides for the cross member receptacles to be arranged on the holding elements in regions having the greatest spacing from one another.

Further features and advantages of the invention form the subject matter of the description below and of the illustration of an exemplary embodiment in the drawing.

BRIEF DESCRIPTION OF THE DRAWINGS

FIG. 10 shows a view of the holding base in the direction of the arrow G in FIG. 9;

FIG. 11 shows a section along the line 11-11 in FIG. 10; and

DETAILED DESCRIPTION OF THE INVENTION

Figure 1:
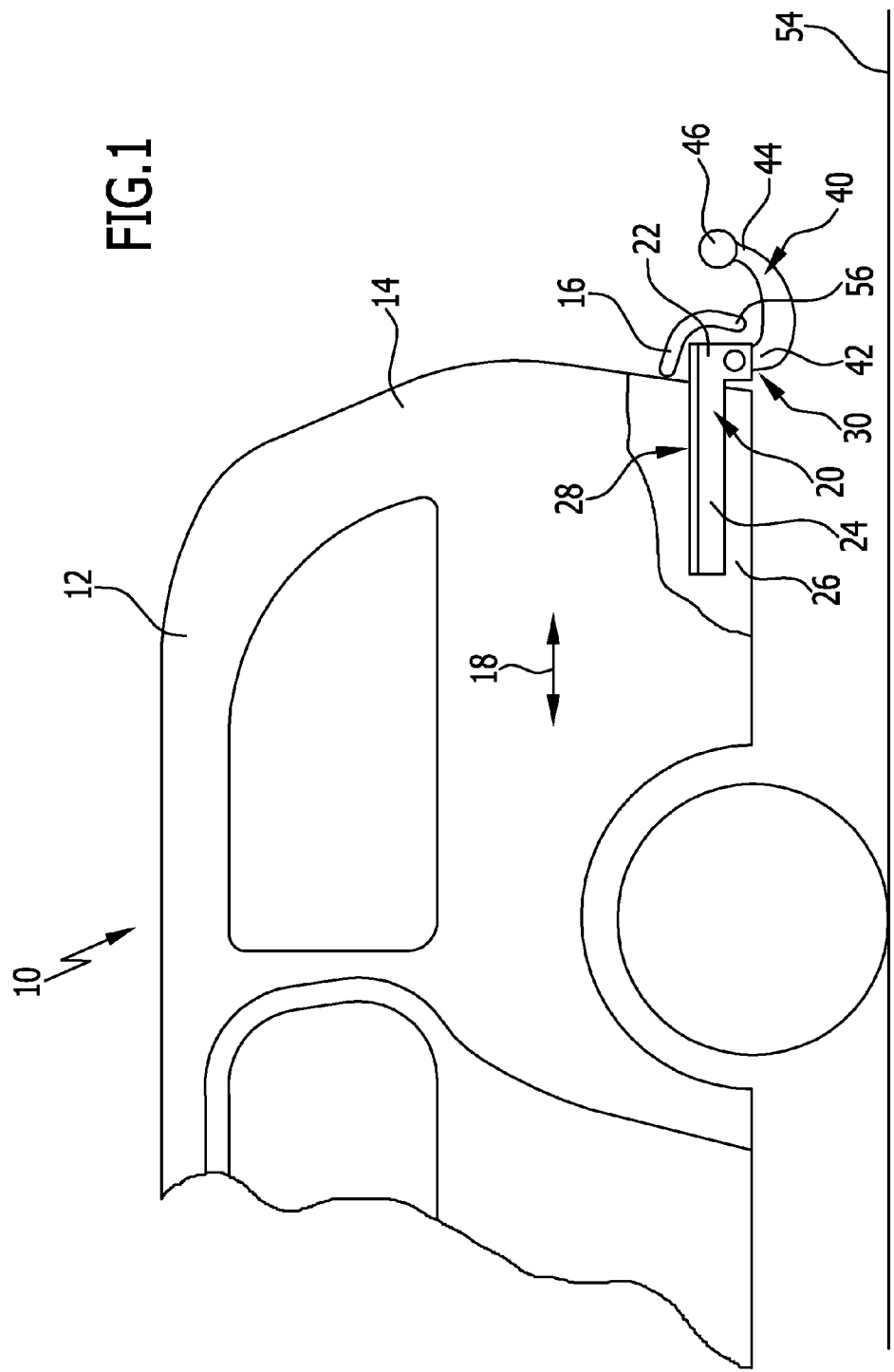
FIG. 1 shows a perspective and partly cut-away view of a motor vehicle having a trailer coupling according to the invention.

A motor vehicle that is designated 10 as a whole in FIG. 1 includes a vehicle body 12, on which there is mounted in a rear region 14 a trailer coupling 20 according to the invention that has a cross member 22, which is covered by a bumper unit 16 and extends transversely to a longitudinal direction 18 of the vehicle body 12 and transversely over the rear region 14, and side supports 24, which extend approximately parallel to the longitudinal direction 18 of the motor vehicle 12 along body wall portions 26 and are fixed thereto and which, together with the cross member 22, form a holding unit 28 that is covered partly by the vehicle body 12 and partly by the bumper unit 16.

Figure 2:
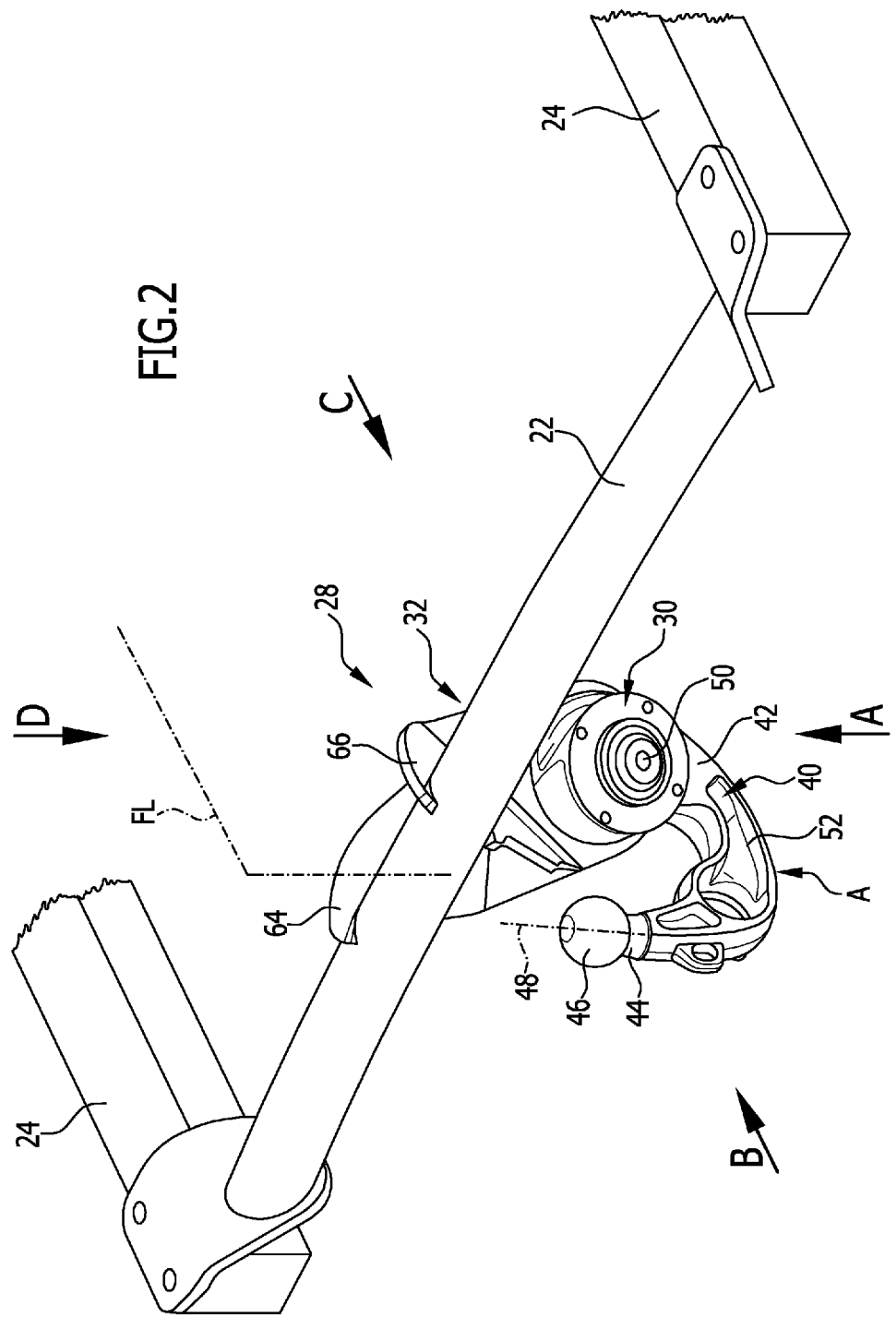
FIG. 2 shows a perspective illustration of a first exemplary embodiment of the trailer coupling according to the invention.

Provided on the holding unit 28 is a holding base 32 of a bearing unit that is designated 30 as a whole, for example a pivot bearing unit, to which a ball neck that is designated 40 as a whole is connected by means of a first end 42, this ball neck moreover carrying at a second end 44 a coupling ball that is designated 46, as illustrated in FIGS. 1 and 2.

Figure 3:
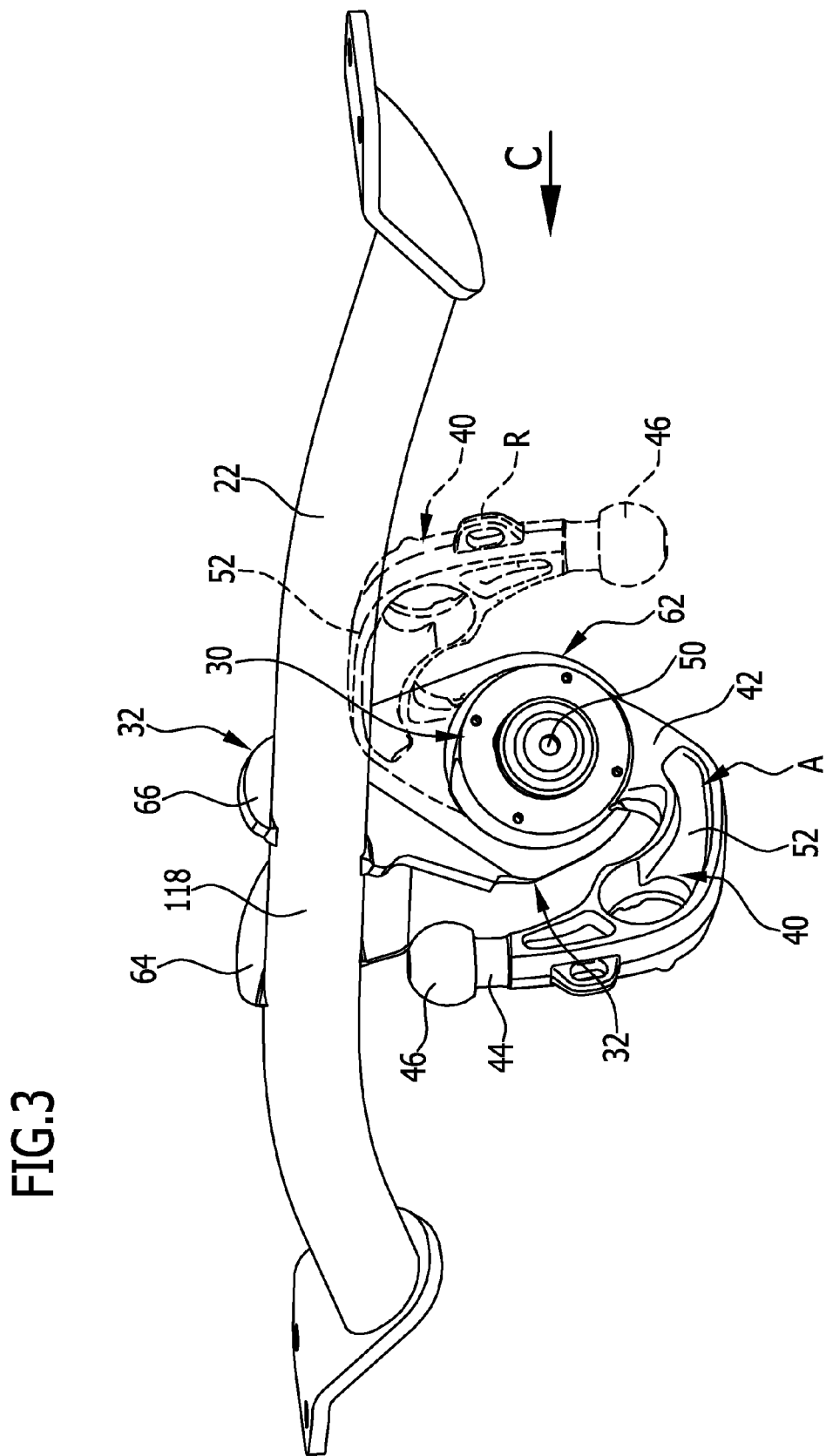
FIG. 3 shows a view of the trailer coupling in the direction of the arrow A in FIG. 2.
Figure 4:
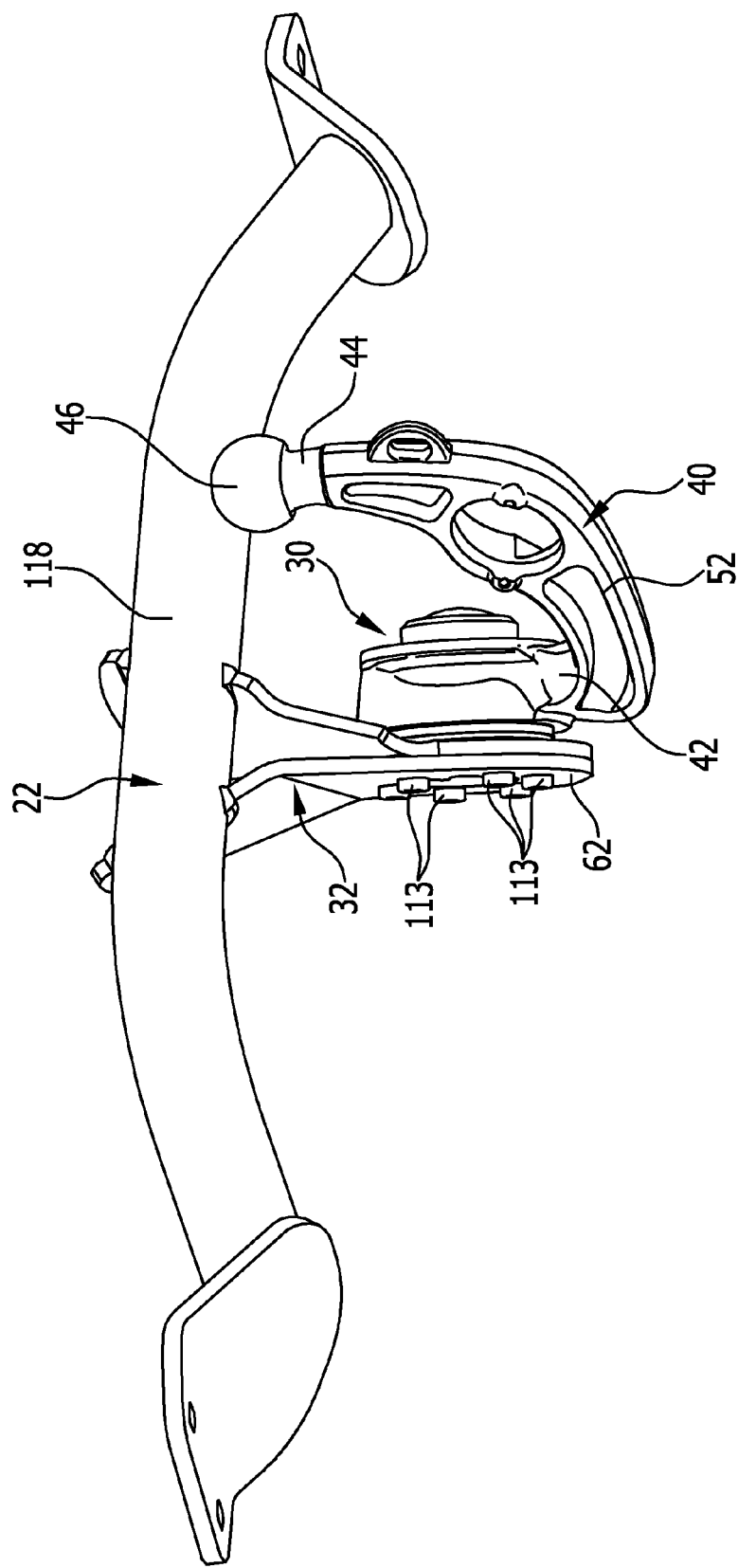
FIG. 4 shows a view in the direction of the arrow B in FIG. 2.

The pivot bearing unit 30 provides the possibility of pivoting the ball neck 40 from an operative position A, which is illustrated in FIGS. 2 and 3 and in which a ball centre axis 48 of the coupling ball 46 lies on a vertical vehicle longitudinal centre plane FL that is parallel to the longitudinal direction 18, about a pivot axis 50 that runs transversely, in particular obliquely and preferably at an acute angle to the vehicle longitudinal centre plane FL, into a rest position R that is illustrated in FIG. 3, in which a centre portion 52 of the ball neck extends transversely to the vehicle longitudinal centre plane FL and the coupling ball 46 lies laterally with respect to the vehicle longitudinal centre plane FL, as illustrated in FIG. 3.

In particular, in this arrangement the ball neck 40 in the rest position R is arranged in a position that is covered by the bumper unit 16 of the vehicle body 12, laterally with respect to the vehicle longitudinal centre plane FL.

With such an arrangement of the pivot axis 50, in particular there is the possibility of arranging the ball neck 40 in the rest position on a side of the coupling ball 46 remote from a road surface 54, as illustrated in dashed lines in FIG. 3.

There is at least the possibility of arranging the ball neck 40 in the rest position at a spacing from the road surface 54 such that it is higher up than a lower edge 56 of the bumper unit 16, in relation to the course of the road surface 54.

Figure 5:
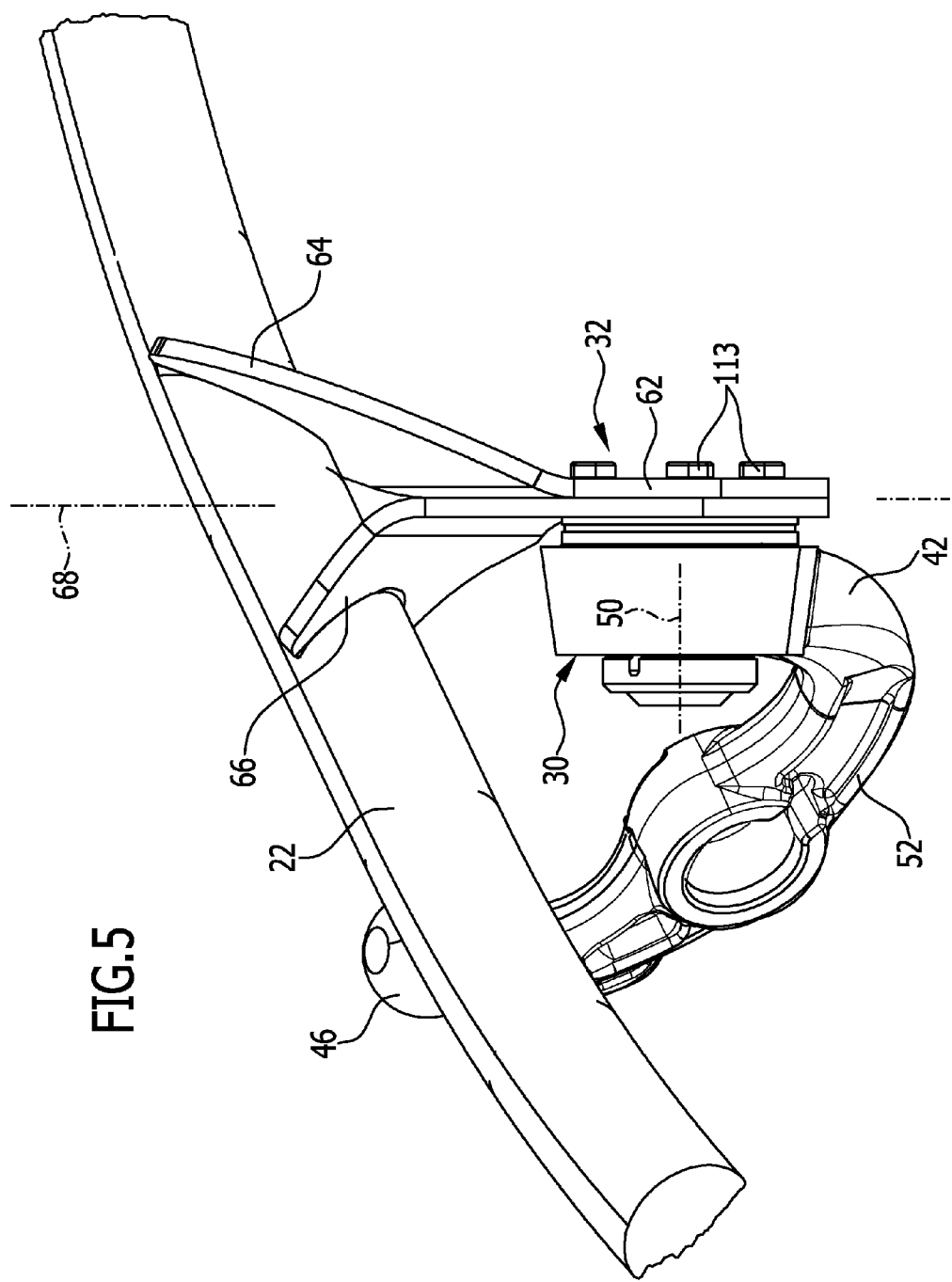
FIG. 5 shows a view in the direction of an arrow C in FIG. 2, and in the operative position.
Figure 6:
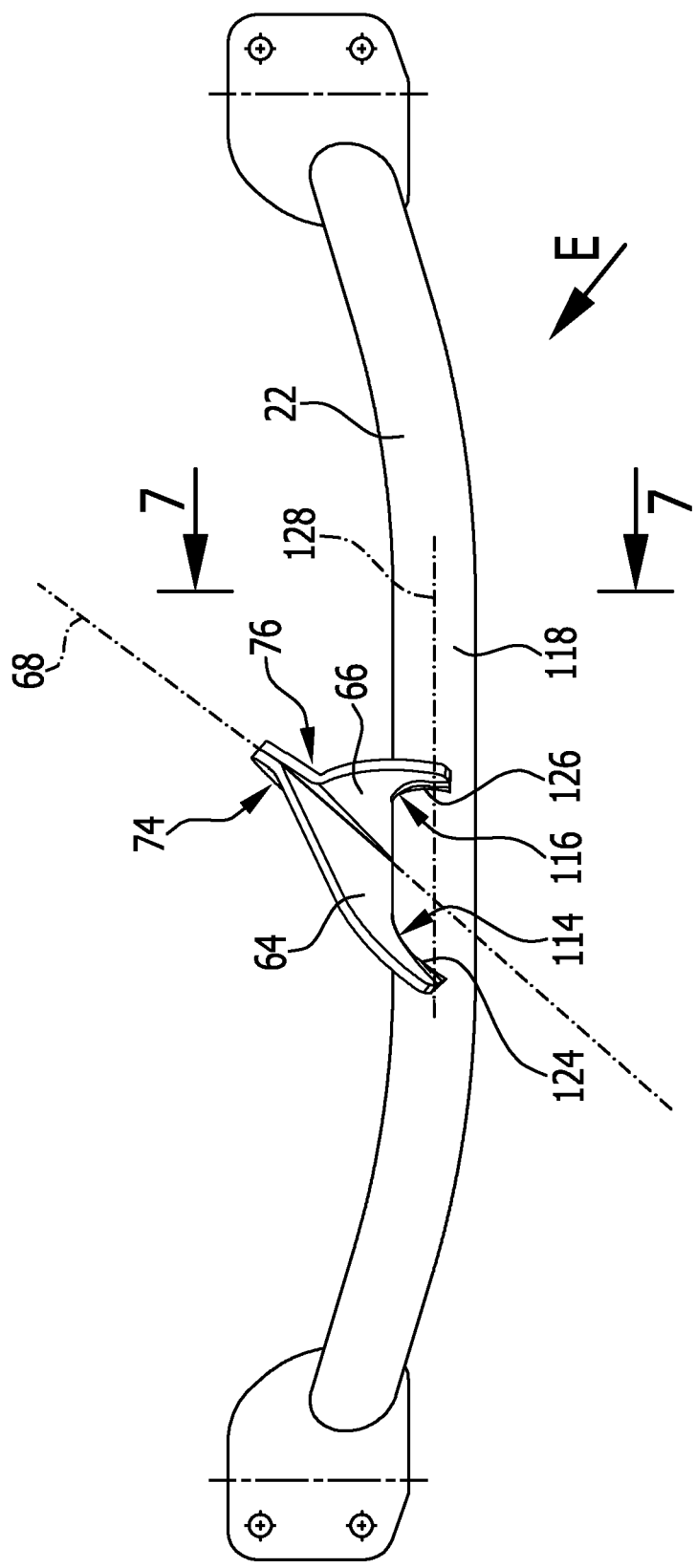
FIG. 6 shows a view of a cross member with a holding base, in the direction of the arrow D in FIG. 2.
Figure 7:
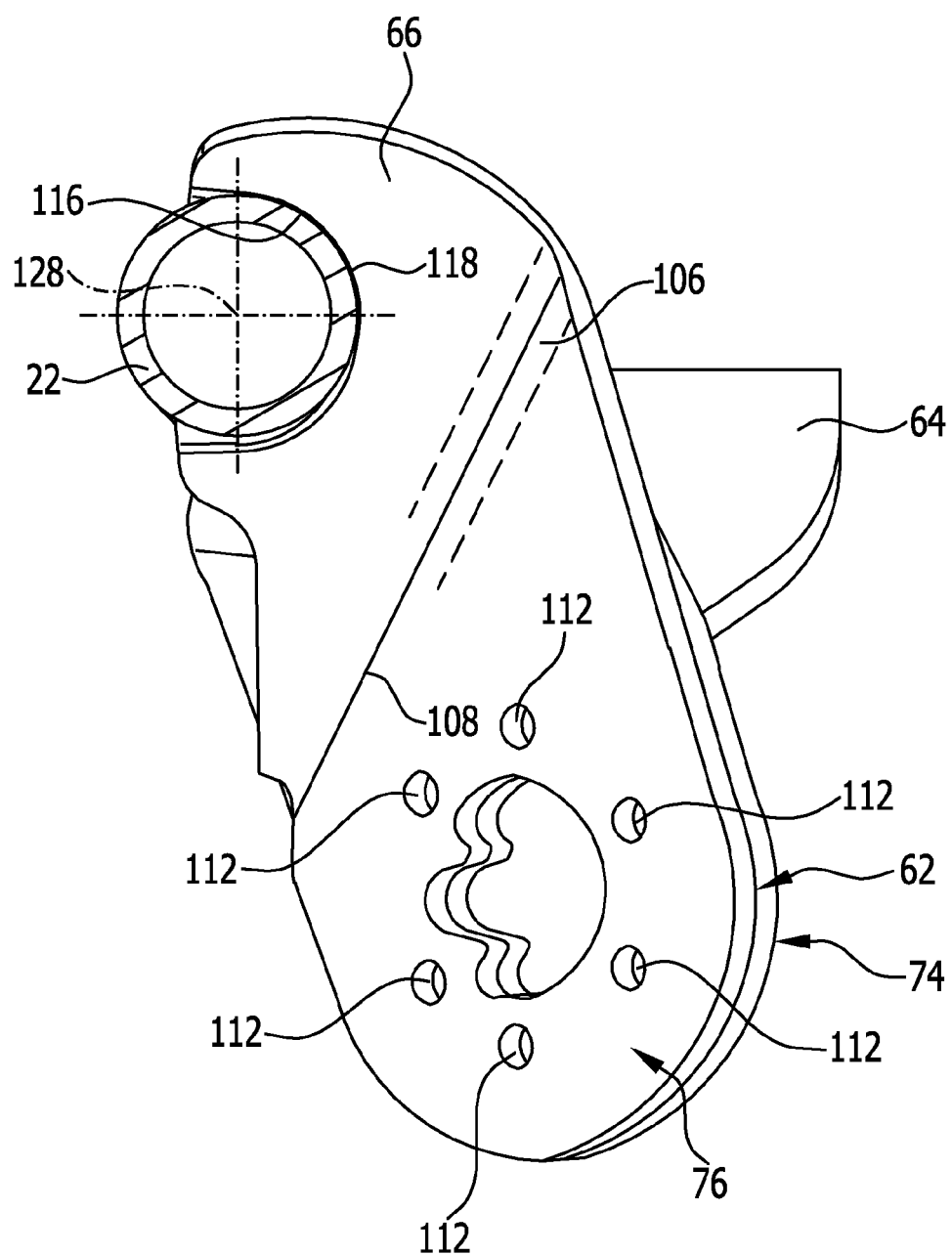
FIG. 7 shows a section along the line 7-7 in FIG. 6.
Figure 8:
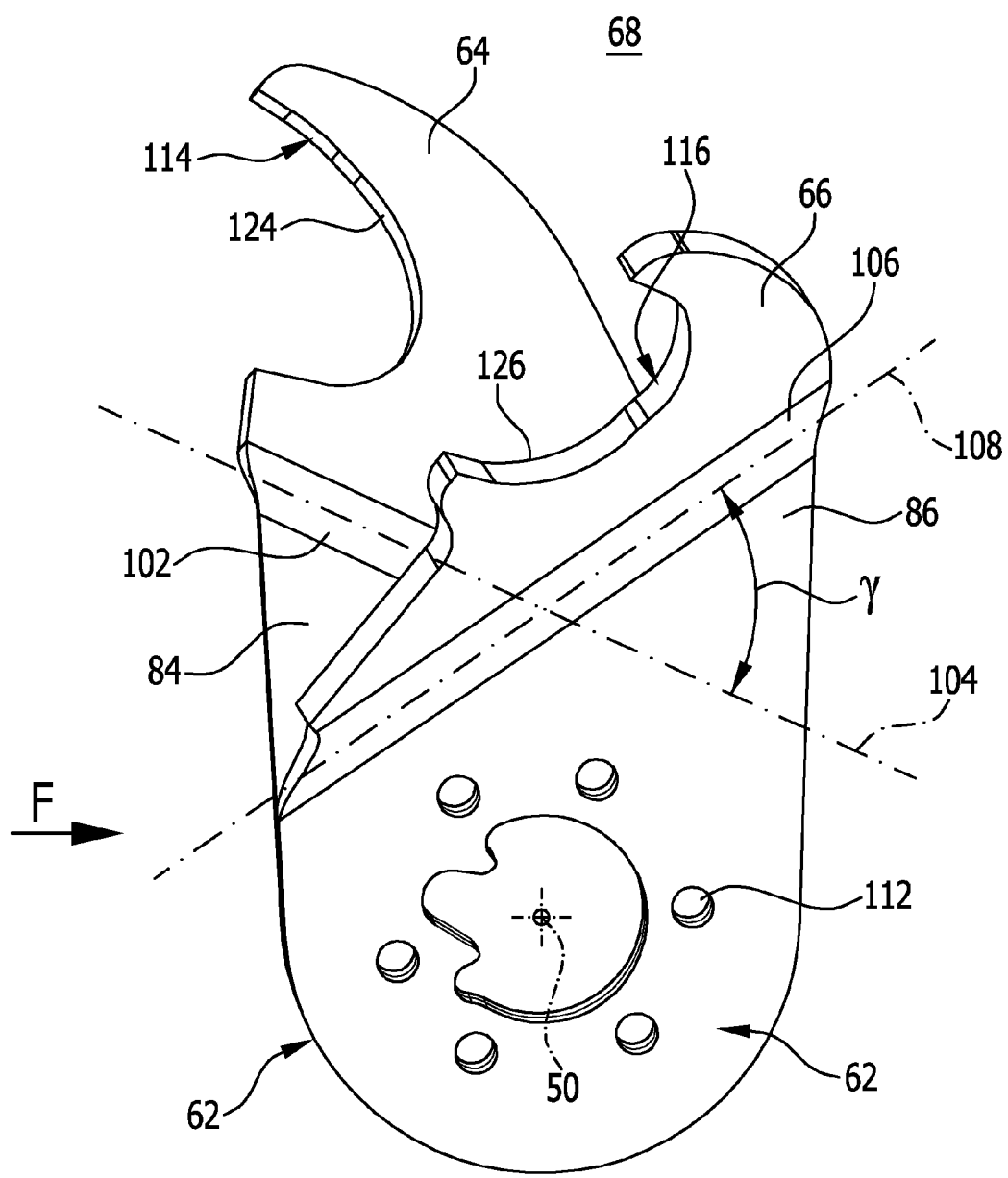
FIG. 8 shows an enlarged view of the holding base in the direction of the arrow E in FIG. 6.
Figure 9:
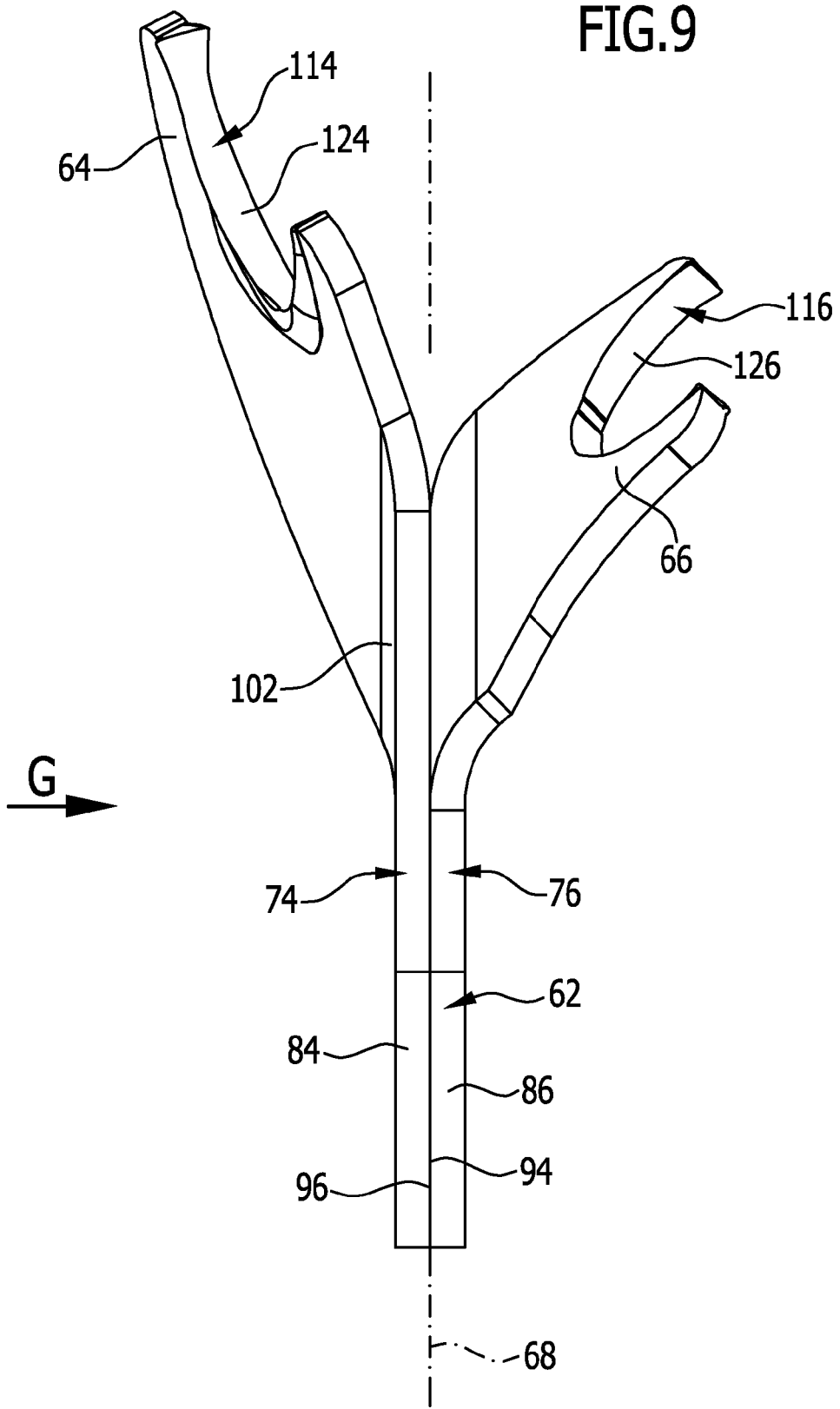
FIG. 9 shows an enlarged view of the holding base in the direction of the arrow F in FIG. 8.
Figure 12:
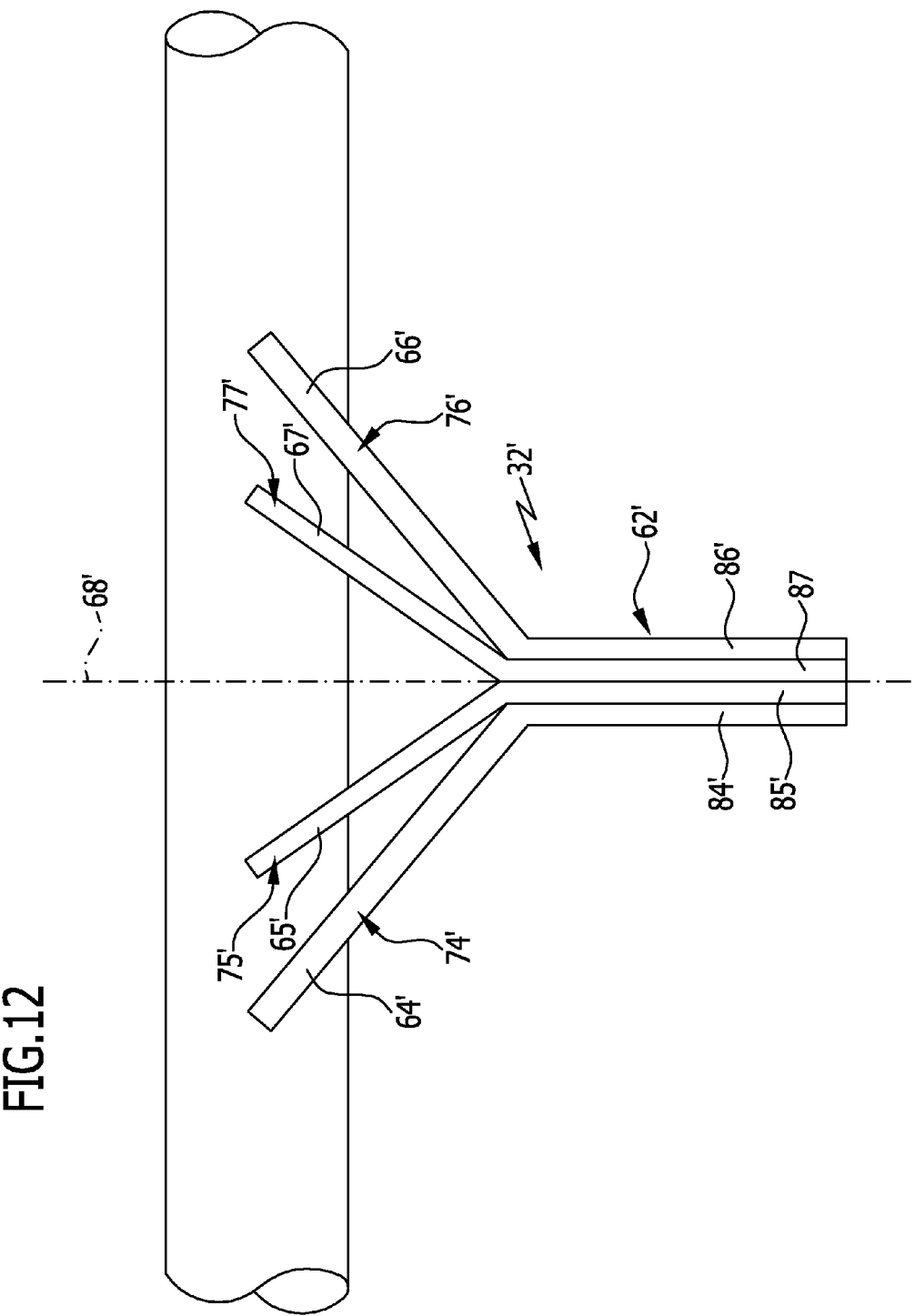
FIG. 12 shows a plan view of the holding base and the part of the cross member carrying the latter, in a second exemplary embodiment.

As illustrated in FIGS. 3 to 11, the holding base 32 includes a flange unit 62, on which the pivot bearing unit 30 is mounted, and holding elements 64 and 66 that extend in a manner projecting from the flange unit 62 and, as illustrated in FIGS. 3 to 11, in projecting from the flange unit 62 extend increasingly far away from one another and in particular, projecting from a geometric centre plane 68 of the flange unit 62, run at an increasing spacing from the centre plane 68 as the spacing from the flange unit 62 increases, as illustrated in FIGS. 6 and 9.

Preferably, as illustrated in FIGS. 5 and 6, the geometric centre plane 68 runs obliquely with respect to a centre axis 128 of the cross member 22 in the region of the cross member 22 that carries the holding base 32, as illustrated in FIG. 6.

In particular, in this arrangement the holding base 32 is formed by two elements 74 and 76 made from flat material, which have two flange elements 84 and 86 that abut against each other for example by means of mutually facing abutment sides 94 and 96, wherein the abutment sides 94 and 96 each border the centre plane 68 of the flange unit 62 such that both abutment sides 94 and 96 are ultimately arranged bordering on the geometric centre plane 68.

Projecting from the flange element 84, the element 74 includes the holding element 64, which is bent in relation to the flange element 84 along a bend line 104 and thus, projecting from the bend line 104, at an angle to the centre plane 68, and runs at an increasing spacing from the centre plane 68 as the spacing from the bend line 104 increases.

Preferably, in this arrangement, the holding element 64 is also a part made from the flat material from which the element 74 is formed, with the result that—as illustrated in FIGS. 8 to 11—the flange element 84 and the holding element 64 are each flat material parts that merge with one another in one piece by way of a bend region 102 predetermined by the bend line 104, wherein the flat material parts form with one another an obtuse angle α that is in the range between 100 degrees and 170 degrees.

The acute angle β at which the holding element 64 runs in relation to the abutment side 94 and thus to the centre plane 68 is in the range between 10 degrees and 80 degrees, preferably in the range between 20 degrees and 60 degrees.

The holding element 66 is also—as illustrated in FIGS. 8 and 9—part of the element 76 that includes the flange element 86, relative to which the holding element 66 runs at an angle, projecting from a bend line 106.

The element 76 is also formed from flat material, wherein the flange element 86 and the holding element 66 merge with one another by way of a bend region 108 predetermined by the bend line 106 and the flat material parts form with one another an obtuse angle that is also in the range between 100 degrees and 170 degrees.

In particular, the holding element 66 runs in relation to the abutment side 96 of the flange element 66, projecting from the bend line 106 at an angle in the range between 10 degrees and 80 degrees, preferably in the range between 20 degrees and 60 degrees.

Thus, the holding element 66 also runs from the bend line 106 at an acute angle in relation to the centre plane 68.

As can be seen from the projection according to FIG. 8, the bend lines 104 and 106 do not run parallel to one another but rather their projection onto the centre plane 68, which in FIG. 6 is represented by the plane of the drawing, produces an acute angle γ between the bend lines 104 and 106 that is in the range between 15 degrees and 140 degrees, preferably in the range between 40 degrees and 100 degrees.

The flange elements 84 and 86 are for their part provided with identically arranged apertures 112, which are arranged around the pivot axis 50, preferably on a circular line around the pivot axis 50, and serve to receive mounting screws by means of which the pivot bearing unit 30 is mountable on the flange unit 62.

In principle, it would be conceivable to connect the flange elements 84 and 86 to one another, for example by spot welding or by adhesion over a surface.

A connection of this kind is not necessary, however, since screws 113 that pass through the apertures 112 for mounting the pivot bearing unit 30 at the same time clamp the two flange elements 84 and 86 to one another such that the latter are firmly connected to one another by the mounting of the pivot bearing unit 30 to the flange unit 62.

For connection to the cross member 22, the holding elements 64, 66 are provided with cross member receptacles 114, 116 (FIGS. 7 to 9), which are created by portions cut out of the flat material that forms the holding elements 64, 66, wherein the course of edge contours 124, 126 of the cross member receptacles 114 and 116 that are formed by the cutouts is adapted to an outer peripheral surface 118 of the cross member 22 against which the cross member receptacles 114 and 116 preferably abut linearly by means of their edge contours 124 and 126 and are welded to the cross member 22 along the linearly abutting edge contours 124 and 126, wherein preferably a linear weld connection is produced.

Preferably, the cross member receptacles 114 and 116 are formed such that, as illustrated in FIGS. 6 and 7, they engage around the outer peripheral surface 118 of the cross member 22 in a peripheral region that extends over more than an angular range of 120 degrees about a centre axis of the cross member, preferably an angular range of more than 150 degrees about the centre axis 128 of the cross member 22.

The holding base 32 according to the invention on the one hand, as a result of the holding elements 64 and 66 that run in a manner diverging from one another, permits a stable connection that is in particular resistant to bending between the holding base 32 and the cross member 22, and is moreover producible in a simple manner in that it includes two elements 74 and 76 made from a plate-shaped flat material in which in each case the holding element 64, 66 is bent away in relation to the flange element 84 and 86 forming the flange unit 62 along a bend line 104, 106, in order on the one hand to obtain, in the case of for example mutually abutting flange elements 84 and 86 that are connected to one another to form the flange unit 62, the divergent path of the holding elements 84 and 86.

In a second exemplary embodiment of a trailer coupling according to the invention, the holding base 32' includes a flange unit 62' that is formed from more than two, for example four, elements 74', 75', 75' and 77' made from flat material, wherein each of the elements 74' to 77' has a holding element 64', 65', 66' and 67' and a corresponding flange element 84', 85', 86', 87'.

All the flange elements 84', 85', 86', 87' run parallel to the centre plane 68' and in particular abut flat against one another in order to form the flange unit 62' that carries the bearing unit 30.

The holding elements 64', 65', 66' and 67' form an obtuse angle with the flange elements 84', 85', 86', 87'.

In particular, in the second exemplary embodiment as illustrated in FIG. 11 as well, the holding elements 64', 65', 66', 67' run at an increasing spacing from one another as the spacing from the flange unit 62' increases.

Otherwise, in the second exemplary embodiment the features that have not been mentioned separately are identical or similar to those of the first exemplary embodiment, so reference can be made in full to the statements regarding the first exemplary embodiment.

The invention claimed is:

1. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member; and
  the holding base is formed by two elements made from flat material, each of which includes a flange element that contributes to the formation of the flange unit, and each of which forms one of the holding elements that extend, projecting from the flange unit, in the direction of the cross member.

2. A trailer coupling according to claim 1, wherein the flange unit comprising the flange elements is formed such that the flange elements abut against one another by means of mutually facing abutment sides.

3. A trailer coupling according to claim 1, wherein the holding elements abut against an outer peripheral surface of the cross member.

4. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member;
  each of the holding elements is firmly connected to a respective flange element; and
  each of the holding elements merges in one piece with the respective flange element.

5. A trailer coupling according to claim 4, wherein each of the holding elements is arranged in relation to the corresponding flange element such that it merges with the respective flange element by way of a bend region.

6. A trailer coupling according to claim 5, wherein the holding elements are bent around along a bend line in relation to the corresponding flange elements.

7. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member; and
  the holding elements run at an increasing spacing from one another as the spacing from the flange unit increases.

8. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member; and
  the respective holding elements extend at an increasing spacing from a centre plane of the flange unit as an extent of the respective holding elements away from the flange unit increases.

9. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member; and
  the holding elements lie at an acute angle to a centre plane of the flange unit.

10. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member; and
  a first member of the holding elements and a respective flange element thereof that form an obtuse angle with one another.

11. A trailer coupling according to claim 10, wherein the obtuse angle between the first member of the holding elements and the respective flange element is in the range between 100 degrees and 170 degrees.

12. A trailer coupling according to claim 10, wherein a projection of a plurality of bend lines for the holding elements onto a centre plane therebetween results in an intersecting path of the projected bend lines.

13. A trailer coupling according to claim 12, wherein the projected bend lines form an acute angle with one another.

14. A trailer coupling according to claim 13, wherein the acute angle is in the range between 15 degrees and 140 degrees.

15. A trailer coupling for motor vehicles, including a cross member, which is connectable to a motor vehicle body, and a bearing unit, which carries a ball neck that at a first end is connected to the bearing unit and at a second end carries a coupling ball, and a holding base, which carries the bearing unit and is connected to the cross member, the holding base has a flange unit, for receiving the bearing unit, and two holding elements that project from the flange unit and in so doing run at a spacing from one another and act on the cross member;
  the holding elements are provided with cross member receptacles that abut against the outer peripheral surface of the cross member; and
  the cross member receptacles take the form of cutouts provided in the holding elements such that in the region of the cross member receptacles the holding elements extend transversely to the cross member at an angle other than 90 degrees.

16. A trailer coupling according to claim 15, wherein the cross member receptacles are formed by edge contours of the holding elements that abut against the outer peripheral surface of the cross member.

17. A trailer coupling according to claim 16, wherein the cross member receptacles abut against the outer peripheral surface along their edge contours.

18. A trailer coupling according to claim 16, wherein the cross member receptacles are welded to the cross member linearly and along their edge contour.

19. A trailer coupling according to claim 15, wherein the cross member receptacles engage around the outer peripheral surface of the cross member over an angular range of at least 120 degrees in relation to a centre axis of the cross member.

20. A trailer coupling according to claim 19, wherein the cross member receptacles engage around the outer peripheral surface of the cross member over an angle of at least 150 degrees.

21. The trailer coupling of claim 20, wherein the angle is at least 180 degrees.

22. A trailer coupling according to claim 15, wherein the cross member receptacles are arranged on the holding elements in regions having the greatest spacing from one another.

\* \* \* \* \*